US012610066B2

(12) United States Patent
Yu

(10) Patent No.: US 12,610,066 B2
(45) Date of Patent: Apr. 21, 2026

(54) VIDEO ENCODING METHOD, VIDEO ENCODING DEVICE, AND IMAGE PROCESSING DEVICE

(71) Applicant: SigmaStar Technology Ltd., Xiamen (CN)

(72) Inventor: Guan-Lin Yu, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 588 days.

(21) Appl. No.: 17/970,616

(22) Filed: Oct. 21, 2022

(65) Prior Publication Data

US 2023/0171416 A1    Jun. 1, 2023

(30) Foreign Application Priority Data

Dec. 1, 2021    (CN) .......................... 202111455865.3

(51) Int. Cl.
| | |
|---|---|
| *H04N 19/186* | (2014.01) |
| *H04N 19/176* | (2014.01) |
| *H04N 19/182* | (2014.01) |
| *H04N 19/423* | (2014.01) |

(52) U.S. Cl.
CPC ......... *H04N 19/186* (2014.11); *H04N 19/176* (2014.11); *H04N 19/182* (2014.11); *H04N 19/423* (2014.11)

(58) Field of Classification Search
CPC ............... H04N 19/186; H04N 19/136; G09G 2320/0261; G09G 2320/103; G09G 2320/106; G09G 2360/16; G09G 2360/12; G06F 16/785; G06F 16/00
See application file for complete search history.

(56) References Cited

U.S. PATENT DOCUMENTS

| | | | | |
|---|---|---|---|---|
| 7,391,468 | B2 * | 6/2008 | Shah ...................... | H04N 7/012 |
| | | | | 348/448 |
| 9,235,916 | B2 * | 1/2016 | Tanaka ..................... | G06T 5/70 |
| 2003/0189980 | A1 * | 10/2003 | Dvir ....................... | H04N 19/51 |
| | | | | 375/E7.176 |
| 2004/0202245 | A1 * | 10/2004 | Murakami ........... | H04N 11/042 |
| | | | | 375/240 |
| 2006/0007238 | A1 * | 1/2006 | Yamamoto ........... | G09G 3/3406 |
| | | | | 345/589 |
| 2006/0167987 | A1 * | 7/2006 | Yamane .................. | H04L 12/56 |
| | | | | 709/203 |

(Continued)

*Primary Examiner* — Daniel Chang
(74) *Attorney, Agent, or Firm* — WPAT, PC

(57) ABSTRACT

A video encoding method for encoding a video including multiple frames, each containing multiple blocks, includes the following steps: reading multiple first characteristic data of a first frame from an external memory to a memory; reading multiple pixel data of a second frame from the external memory to the memory, the second frame being subsequent to the first frame; generating multiple second characteristic data of the second frame based on the pixel data in the memory; encoding, block by block, the pixel data of the second frame in the memory; calculating, block by block, a difference value between the first characteristic data and the second characteristic data; calculating motion information according to the difference values of the blocks; and determining an encoding bitrate based on the motion information.

10 Claims, 12 Drawing Sheets

S210 — setting the video encoding device

S220 — reading pixel data of the k^th frame from the external memory to the internal memory S230 — determining a video encoding bitrate of the k^th frame according to motion information of the (k-1)^th frame and encodes the k^th frame block by block based on the video encoding bitrate S240 — generating a plurality of characteristic data of the k^th frame based on a plurality of pixel data of the k^th frame S250 — reading the characteristic data of the (k-1)^th frame from the external memory S260 — calculating, block by block, a plurality of difference values between the characteristic data of the k^th frame and the characteristic data of the (k-1)^th frame S270 — storing the characteristic data of the k^th frame in the external memory S280 — calculating the motion information according to the difference values

(56)  References Cited

U.S. PATENT DOCUMENTS

| | | | |
|---|---|---|---|
| 2008/0055481 A1* | 3/2008 | Delanghe | H04N 9/78 348/667 |
| 2011/0129014 A1* | 6/2011 | Lee | H04N 19/176 375/E7.123 |
| 2011/0129017 A1* | 6/2011 | Oami | G06F 16/7847 375/E7.076 |
| 2011/0176741 A1* | 7/2011 | Sato | H04N 19/61 382/238 |
| 2011/0243221 A1* | 10/2011 | Rossholm | H04N 19/126 375/240.03 |
| 2012/0269258 A1* | 10/2012 | Yang | H04N 19/172 375/E7.126 |
| 2015/0320401 A1* | 11/2015 | Takagi | A61B 8/5223 600/443 |
| 2015/0371094 A1* | 12/2015 | Gardiner | G01S 19/13 348/148 |
| 2016/0052764 A1* | 2/2016 | Führer | B67C 3/007 348/143 |
| 2016/0086347 A1* | 3/2016 | Ishihara | H04N 23/80 348/207.1 |
| 2016/0241878 A1* | 8/2016 | Aaron | H04N 19/65 |
| 2017/0013175 A1* | 1/2017 | Wang | G06T 5/70 |
| 2017/0094311 A1* | 3/2017 | Chou | H04N 19/53 |
| 2017/0353667 A1* | 12/2017 | Miyahara | H04N 23/683 |
| 2018/0039852 A1* | 2/2018 | Nakamura | G06T 7/194 |
| 2018/0304898 A1* | 10/2018 | Yoshikawa | G01N 21/55 |
| 2018/0335969 A1* | 11/2018 | Maekawa | G06F 3/0608 |
| 2019/0320167 A1* | 10/2019 | Abe | H04N 19/521 |
| 2025/0113054 A1* | 4/2025 | Chon | H04N 19/105 |
| 2025/0166212 A1* | 5/2025 | Yu | G06T 5/73 |

* cited by examiner

S240 generating a plurality of characteristic data of the k$^{th}$ frame based on the plurality of pixel data of the k$^{th}$ frame S243 extracting the luminance values from the pixel data as the characteristic data S240 — generating a plurality of characteristic data of the $k^{th}$ frame based on the plurality of pixel data of the $k^{th}$ frame S247 — averaging the luminance values of the pixel data to generate the characteristic data

| interval | 0 | 1 | ... | q | ... | Z-2 | Z-1 |
|---|---|---|---|---|---|---|---|
| range | R_0 | R_1 | ... | R_q | ... | R_Z-2 | R_Z-1 |
| number of blocks | X_0 | X_1 | ... | X_q | ... | X_Z-2 | X_Z-1 | motionless intervals ← → motion intervals

FIG. 11

VIDEO ENCODING METHOD, VIDEO ENCODING DEVICE, AND IMAGE PROCESSING DEVICE

BACKGROUND OF THE INVENTION

1. Field of the Invention

The present invention generally relates to image processing, and, more particularly, to video encoding methods, video encoding devices, and image processing devices.

2. Description of Related Art

In the field of image processing, some image encoding methods take the motion information of the image into account.

In the first prior art, the image encoding module is responsible for outputting the motion vectors of all blocks in each frame (where one frame includes multiple blocks) and performs encoding according to the motion vectors. However, some blocks (e.g., intra-coded blocks) do not have motion vectors.

In the second prior art, the image encoding module uses the motion information outputted by the separate motion information calculation module. In comparison with the first prior art, the advantage of the second prior art is that the motion information of each block can be calculated, but the disadvantages are: (1) The motion information calculation module and the image encoding module respectively read the raw data of the image at least once from the memory, which causes waste in memory bandwidth; and (2) an additional approach (e.g., via software) is required for the motion information calculation module to send the result to the image encoding module, which increases the design complexity.

Therefore, there is a need of a video encoding device and method to address the above problems.

SUMMARY OF THE INVENTION

In view of the issues of the prior art, an object of the present invention is to provide a video encoding method, a video encoding device, and an image processing device, so as to make an improvement to the prior art.

According to one aspect of the present invention, a method of encoding a video is provided. The video includes a plurality of frames, and each frame includes a plurality of blocks. The method includes the following steps: reading a plurality of first characteristic data of a first frame from an external memory to a memory; reading a plurality of pixel data of a second frame from the external memory to the memory, the second frame being subsequent to the first frame; generating a plurality of second characteristic data of the second frame based on the pixel data in the memory; encoding the pixel data of the second frame in the memory block by block; calculating a difference value between the first characteristic data and the second characteristic data block by block; calculating motion information according to the difference values of the blocks; and determining an encoding bitrate based on the motion information.

According to another aspect of the present invention, a device for encoding a video is provided. The video includes a plurality of frames, and each frame includes a plurality of blocks. The device includes a memory control circuit, a memory, a calculation circuit, and a video encoding circuit. The memory control circuit reads from an external memory a plurality of first characteristic data of a first frame and a plurality of pixel data of a second frame. The memory stores the first characteristic data and the pixel data read from the external memory. The second frame is subsequent to the first frame. The calculation circuit is coupled to the memory and configured to generate a plurality of second characteristic data of the second frame based on the pixel data and calculate a difference value between the first characteristic data and the second characteristic data block by block. The video encoding circuit is coupled to the memory and configured to determine an encoding bitrate based on motion information and encodes the pixel data of the second frame block by block. The motion information is generated based on the difference values of the blocks.

According to still another aspect of the present invention, a device for processing an image data is provided. The image data includes a first frame and a second frame. The device includes a processor, a first memory, and a video encoding device. The video encoding device includes a memory control circuit, a second memory, a calculation circuit, and a video encoding circuit. The first memory stores a plurality of first characteristic data of the first frame and a plurality of pixel data of the second frame which is subsequent to the first frame. The video encoding device is coupled to the processor and the first memory. The memory control circuit reads the first characteristic data and the pixel data from the first memory. The second memory stores the first characteristic data and the pixel data read from the first memory. The calculation circuit is coupled to the second memory and configured to generate a plurality of second characteristic data of the second frame based on the pixel data and calculate a difference value between the first characteristic data and the second characteristic data block by block. The video encoding circuit is coupled to the second memory and configured to determine an encoding bitrate based on motion information and encode the pixel data of the second frame block by block. The processor generates the motion information according to the difference values of the plurality of blocks and stores the motion information in the first memory.

The video encoding method, the video encoding device, and the image processing device of the present invention calculate the difference value (which can represent the motion information to some extent) block by block, which solves the problem of the first prior art. Furthermore, since the present invention uses the same device (i.e., the video encoding device) to calculate the motion information and perform video encoding, the present invention does not require additional complex software processes to send the motion information to the devices or circuits that use the motion information. In addition, the present invention consumes less memory bandwidth because only one read of the raw data of the image from the external memory is required to complete the video encoding operation and the calculation of the motion information.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 11 is a schematic diagram of statistical data according to an embodiment of the present invention.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes video encoding methods, video encoding devices, and image processing devices. On account of that some or all elements of the video encoding devices and image processing devices could be known, the detail of such elements is omitted provided that such detail has little to do with the features of this disclosure, and that this omission nowhere dissatisfies the specification and enablement requirements. Some or all of the processes of the video encoding method may be implemented by software and/or firmware, and can be performed by the video encoding device or its equivalent. A person having ordinary skill in the art can choose components or steps equivalent to those described in this specification to carry out the present invention, which means that the scope of this invention is not limited to the embodiments in the specification.

Figure 1:
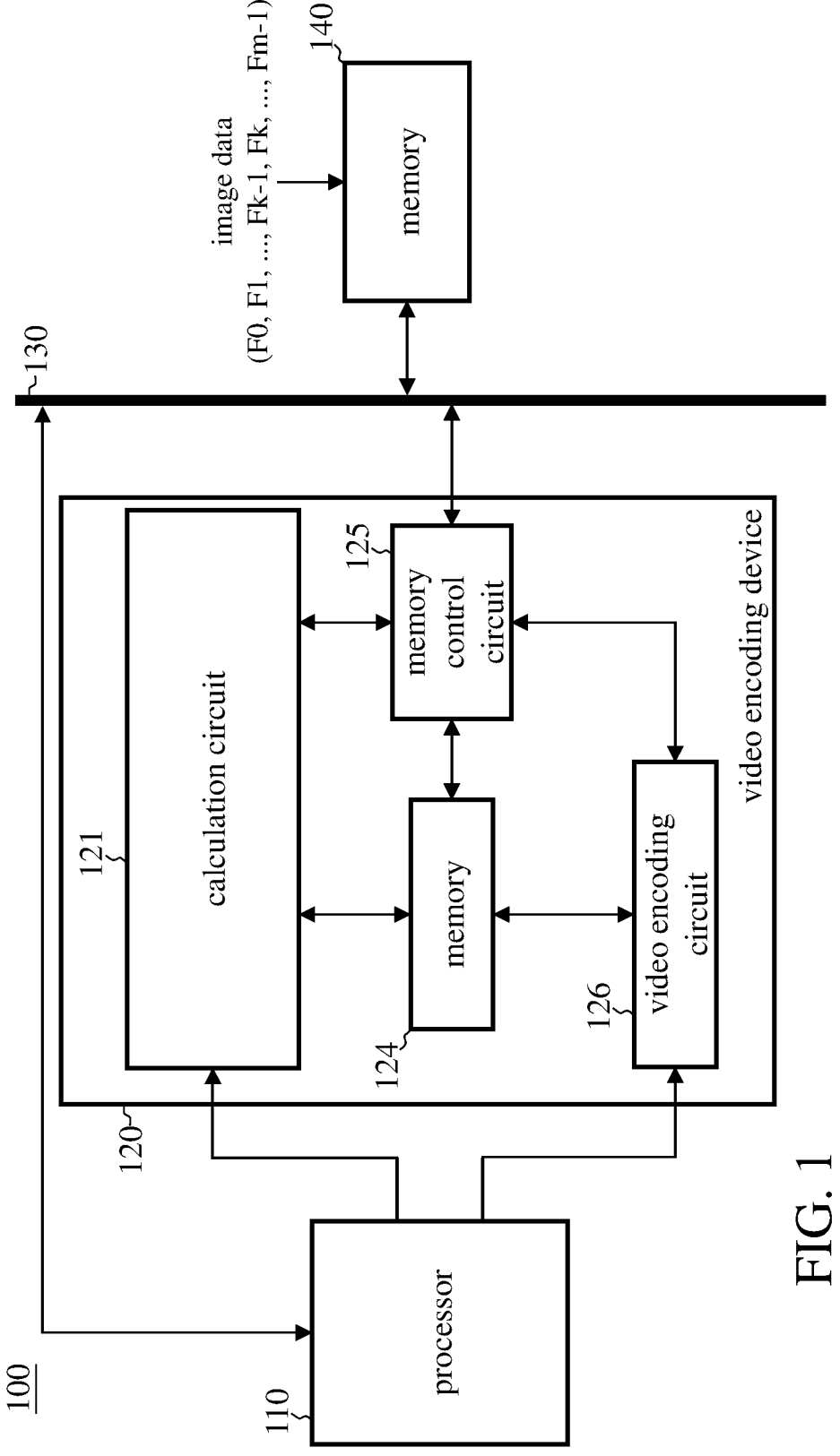
FIG. 1 is a functional block diagram of an image processing device according to an embodiment of the present invention.

FIG. 1 is a functional block diagram of an image processing device according to an embodiment of the present invention. The image processing device 100 includes a processor 110 (including but not limited to the general-purpose processors or special-purpose processors such as the neural network processors, intelligent processors, etc.), a video encoding device 120, a memory bus 130, and a memory 140. The video encoding device 120 includes a calculation circuit 121, a memory 124, a memory control circuit 125, and a video encoding circuit 126. The processor 110, the video encoding device 120, and the memory 140 are all coupled to the memory bus 130, and the processor 110 and the video encoding device 120 access the memory 140 through the memory bus 130. The memory 140 may be a dynamic random-access memory (DRAM), and the memory 124 may be a static random-access memory (SRAM), but they are not limited to these types of memories. The image processing device 100 processes the image data (including but not limited to video streaming), and the memory 140 stores the pixel data of m frames of the image data (which are sequentially: F0, F1, . . . , Fk, . . . , Fm−1, where $1 \le k \le m-1$). The operational details of the image processing device 100 are to be discussed below in connection with the flowchart of FIG. 2.

Figure 2:
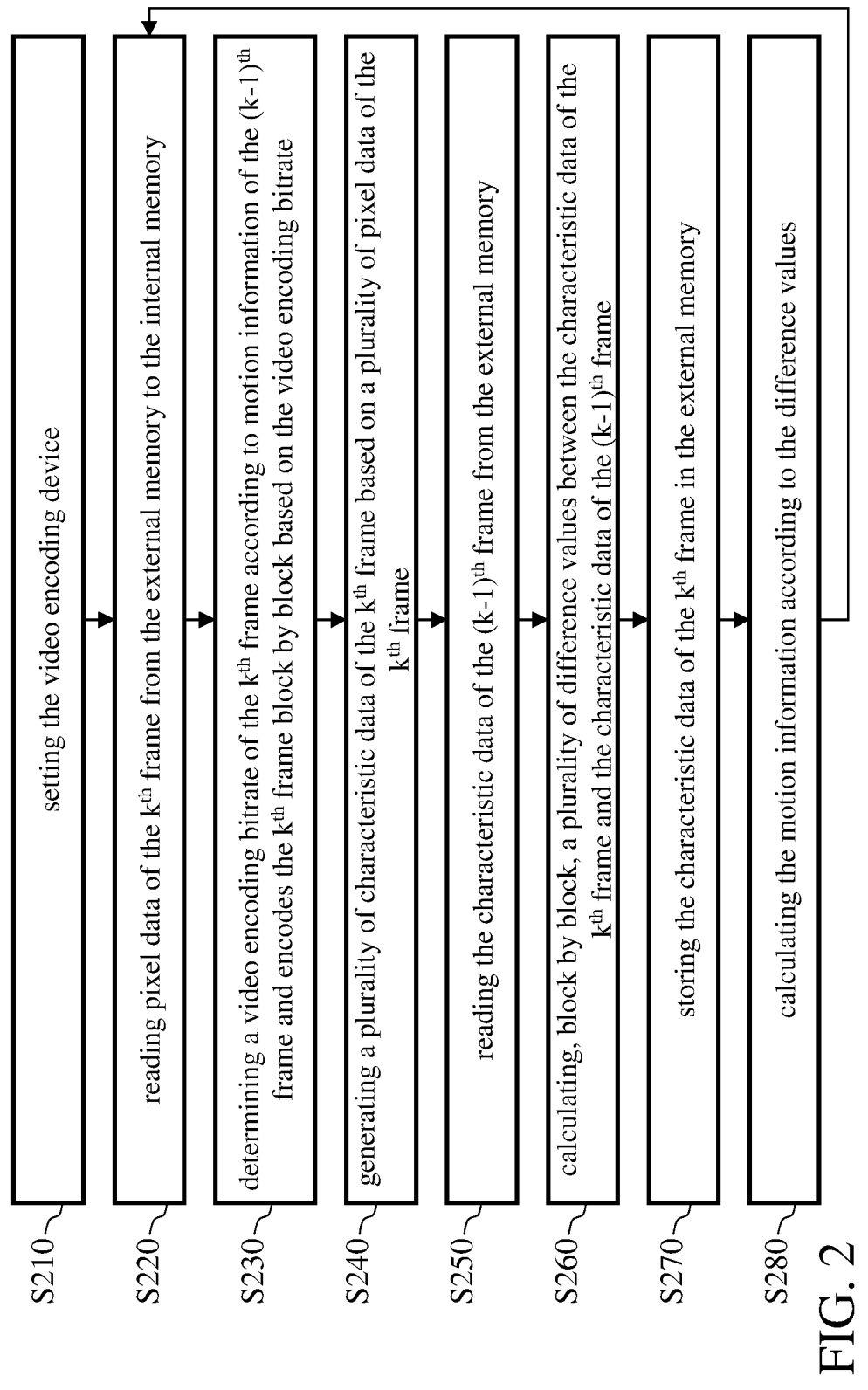
FIG. 2 is a flowchart of a video encoding method according to an embodiment of the present invention.

FIG. 2 is a flowchart of a video encoding method according to an embodiment of the present invention. The video encoding method includes the following steps.

Step S210: The processor 110 sets the video encoding device 120. More specifically, the processor 110 sets parameters of the calculation circuit 121 and the video encoding circuit 126. In some embodiments, the processor 110 sets the encoding-related parameters of the video encoding circuit 126 and sets the parameters such as the scaling factor of the calculation circuit 121 and the memory address(es) of the memory 140.

Step S220: The video encoding device 120 reads pixel data of the $k^{th}$ frame Fk from the memory 140 to the memory 124. More specifically, the $k^{th}$ frame Fk includes a plurality of blocks, each of which includes a plurality of pixels, and the memory control circuit 125 reads the pixel data of one block of the $k^{th}$ frame Fk through the memory bus 130 and then writes the pixel data of the block into the memory 124. Each pixel data stored in memory 124 includes a luminance value (i.e., the Y value in the YUV color space) and chroma values (i.e., the U and V values in the YUV color space).

Step S230: The video encoding circuit 126 determines a video encoding bitrate of the $k^{th}$ frame Fk according to motion information of the $(k-1)^{th}$ frame Fk−1, reads the pixel data of each block from the memory 124, and encodes the $k^{th}$ frame Fk block by block based on the video encoding bitrate. The $(k-1)^{th}$ frame Fk−1 is prior to the $k^{th}$ frame Fk. The calculation of the motion information is to be discussed in the following steps. In some embodiments, the video encoding circuit 126 reads the motion information of the $(k-1)^{th}$ frame Fk−1 from the memory 140 through the memory control circuit 125. For the first frame F0, since there is no motion information of the previous frame, the video encoding circuit 126 encodes the first frame F0 using a predetermined video encoding bitrate. In some embodiments, when the motion information is greater than a threshold (i.e., the motion degree of the previous frame is greater), the video encoding circuit 126 selects a higher video encoding bitrate; otherwise, a lower video encoding bitrate is selected.

Step S240: The calculation circuit 121 reads the pixel data of each block from the memory 124 to generate a plurality of characteristic data of the $k^{th}$ frame Fk based on the plurality of pixel data of the $k^{th}$ frame Fk. The characteristic data may represent the pixel data to some extent or in a certain aspect; for example, the characteristic data may represent the luminance or average luminance of the pixel data. In some embodiments, the calculation circuit 121 extracts the luminance values of the pixel data and uses the luminance values as the characteristic data. In other embodiments, after extracting the luminance values of the pixel data, the calculation circuit 121 averages the luminance values to generate a plurality of averages which are used as the characteristic data.

Step S250: The memory control circuit 125 reads the characteristic data of the $(k-1)^{th}$ frame Fk−1 from the memory 140 and stores the characteristic data of the $(k-1)^{th}$ frame Fk−1 in the memory 124. Because the video encoding device 120 performs operations by blocks, meaning that the memory control circuit 125 needs to read only the characteristic data of a certain block of the $(k-1)^{th}$ frame Fk-1 each time, the size of the memory 124 can be decreased to reduce cost.

Step S260: The calculation circuit 121 reads the characteristic data of each block of the $(k-1)^{th}$ frame Fk-1 from the memory 124 and calculates, block by block, a plurality of difference values between the characteristic data of the $k^{th}$ frame and the characteristic data of the $(k-1)^{th}$ frame. More specifically, the calculation circuit 121 compares the block in the $k^{th}$ frame Fk with the corresponding block in the $(k-1)^{th}$ frame Fk-1 to obtain the difference value of the block. In other words, if a frame includes J blocks (J is a positive integer), J difference values are generated after the calculation circuit 121 finishes step S260. The greater the difference value (i.e., the greater the difference in the characteristic data between two corresponding blocks), the greater the change in the image of the block, that is, the greater the motion degree of the block.

Step S270: The memory control circuit 125 stores the characteristic data of the $k^{th}$ frame Fk in the memory 140. The characteristic data of the $k^{th}$ frame Fk are to be used in step S250 in the next round in which the $(k+1)^{th}$ frame Fk+1 will be processed, the $(k+1)^{th}$ frame Fk+1 being subsequent to the $k^{th}$ frame Fk.

Step S280: The processor 110 calculates motion information according to the difference values. As discussed in step S260, the difference values may represent the degree of changes in the image; in other words, the difference values are closely related to the motion degree (i.e., motion information can indicate that the $k^{th}$ frame Fk is more like a motion image or more like a motionless image) of the $k^{th}$ frame Fk. However, when the number of blocks (i.e., the J value) is large, the processor 110 processes the difference values first for the purpose of utilizing the difference values more efficiently and saving memory. The processed difference values can also reflect the motion degree of the $k^{th}$ frame Fk. People having ordinary skill in the art know how to use conventional statistical methods to perform step S280; however, an example of calculating the motion information is also given below. In some embodiments, the processor 110 stores the motion information in the memory 140; therefore, the motion information can be accessed in the subsequent operations, such as the execution of the Average Variable BitRate (AVBR) algorithm based on the motion information, or the calculation of the motion trend (towards motion or motionless) of image data (e.g., video streaming) based on the motion information.

It should be noted that after the calculation circuit 121 and the video encoding circuit 126 complete the operation on a certain block, the calculation circuit 121 and the video encoding circuit 126 control the memory control circuit 125 to read the next block of the same frame or the first block of the next frame from the memory 140. Because the calculation circuit 121 and the video encoding circuit 126 share the data in the memory 124, the pixel data of any block are read out of the memory 140 only once throughout the steps in FIG. 2.

As discussed above in connection with FIG. 1 and FIG. 2, the video encoding device 120 of the present invention generates the motion information for each frame, which solves the shortcoming of the first prior art. Furthermore, since the calculation circuit 121 and the video encoding circuit 126 are part of the same device (i.e., the video encoding device 120) and perform operations on the same block, the image processing device 100 does not need an additional complicated software process to send the motion information to devices or circuits that use the motion information. In addition, because the image processing device 100 and the flow of FIG. 2 need to read the raw data of the image from the external memory only once to complete the video encoding operation and the calculation of the motion information, there is no waste of the memory bandwidth.

Figure 3:
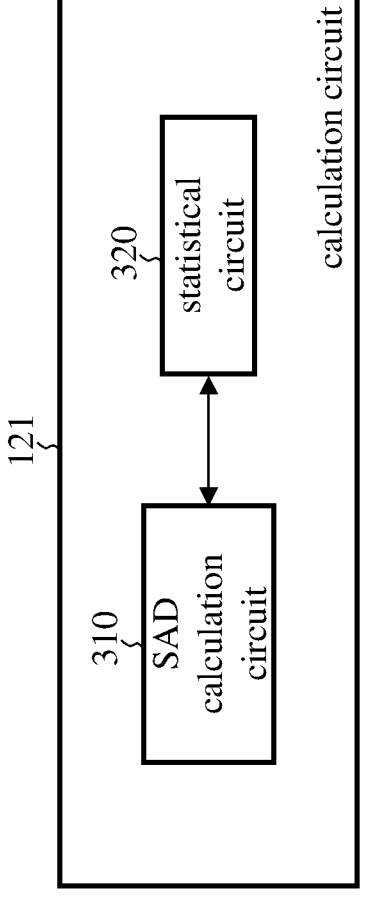
FIG. 3 is a functional block diagram of a calculation circuit according to an embodiment.
Figure 4:
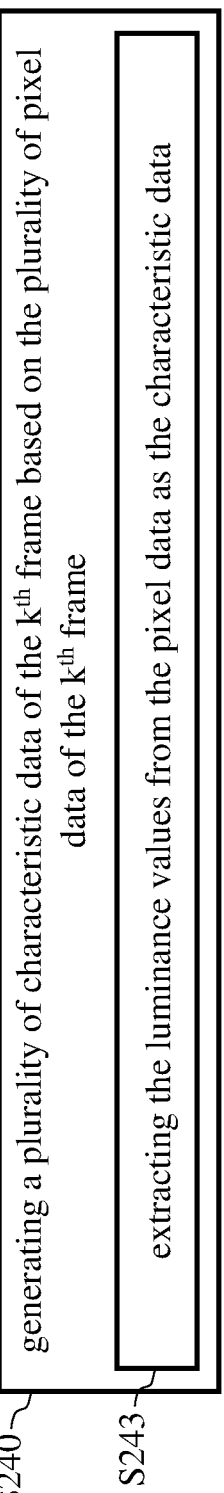
FIG. 4 shows sub-steps of step S240 according to an embodiment.

Reference is made to FIG. 3, which is a functional block diagram of the calculation circuit 121 according to an embodiment. The calculation circuit 121 includes a sum of absolute differences (SAD) calculation circuit 310 and a statistical circuit 320. FIG. 4 shows the sub-step of step S240 according to an embodiment, and the sub-step is performed by the SAD calculation circuit 310. In step S243, the SAD calculation circuit 310 extracts the luminance values from the pixel data and uses the luminance values as the characteristic data. Since the change in the luminance value can effectively reflect the change in the motion of the image, the SAD calculation circuit 310 can perform the calculation based only on the luminance value, which reduces the amount of calculation.

Figure 5:
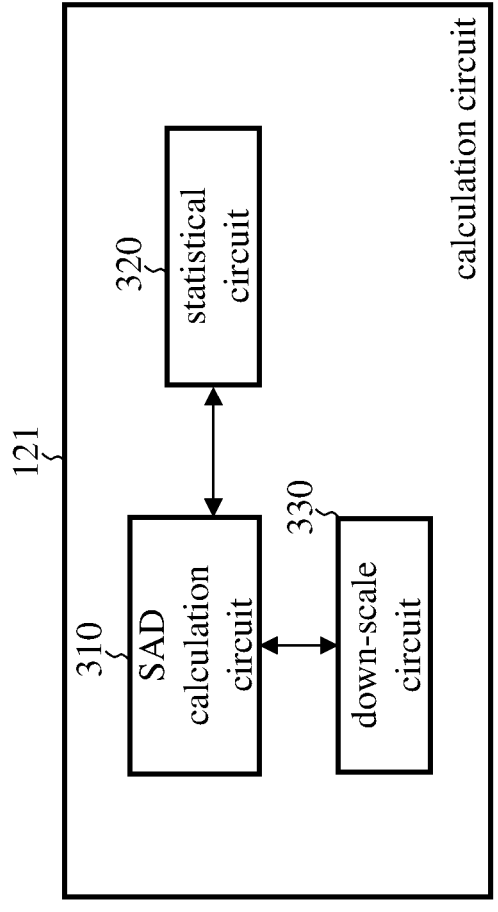
FIG. 5 is a functional block diagram of a calculation circuit according to another embodiment.
Figure 6:
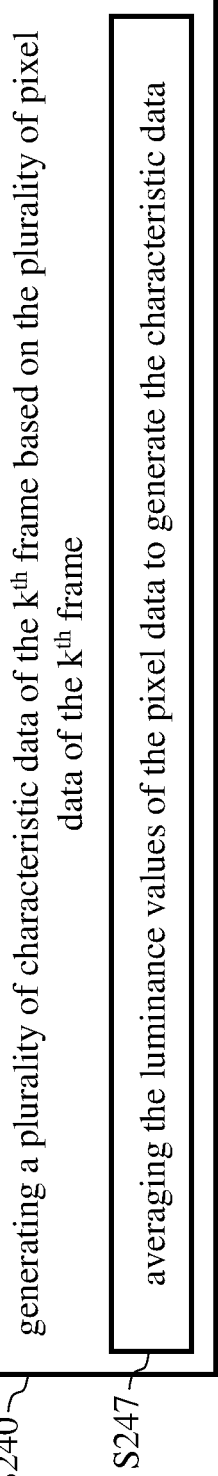
FIG. 6 shows sub-steps of step S240 according to another embodiment.

Reference is made to FIG. 5, which is a functional block diagram of the calculation circuit 121 according to another embodiment. The calculation circuit 121 includes the SAD calculation circuit 310, the statistical circuit 320 and a down-scale circuit 330. FIG. 6 shows the sub-step of step S240 according to another embodiment, and the sub-step is performed by the down-scale circuit 330. In step S247, the luminance values of the pixel data are averaged to generate the characteristic data. Because of the averaging operation (which is equivalent to decreasing the size of the block or reducing the number of luminance values), the number of luminance values of the characteristic data is less than the number of luminance values of the original pixel data. An embodiment of the down-scale circuit 330 is illustrated below in connection with FIGS. 7A, 7B and 8.

Figure 7A:
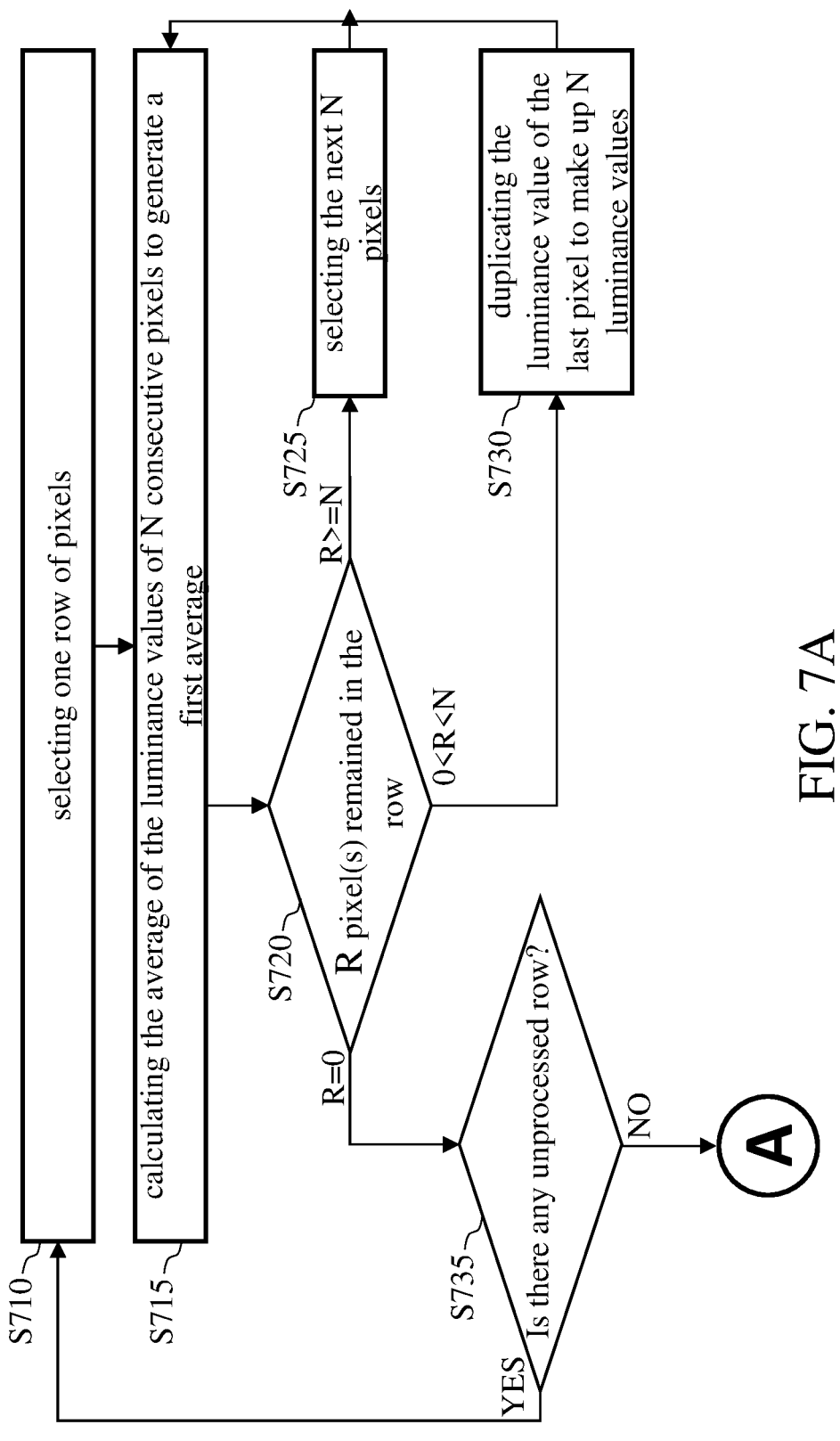
FIGS. 7A and 7B show sub-steps of step S247 according to an embodiment.
Figure 7B:
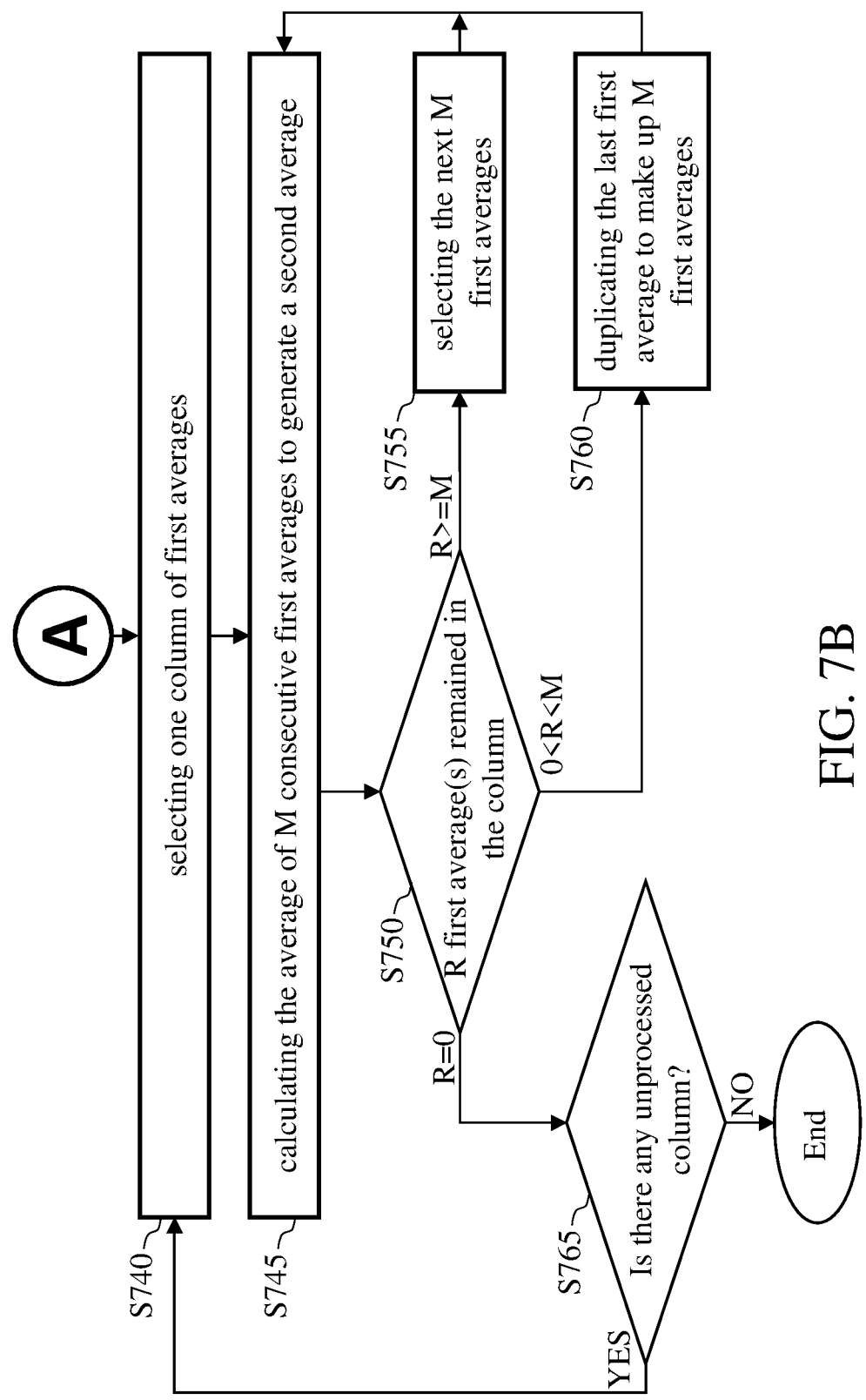
Figure 8:
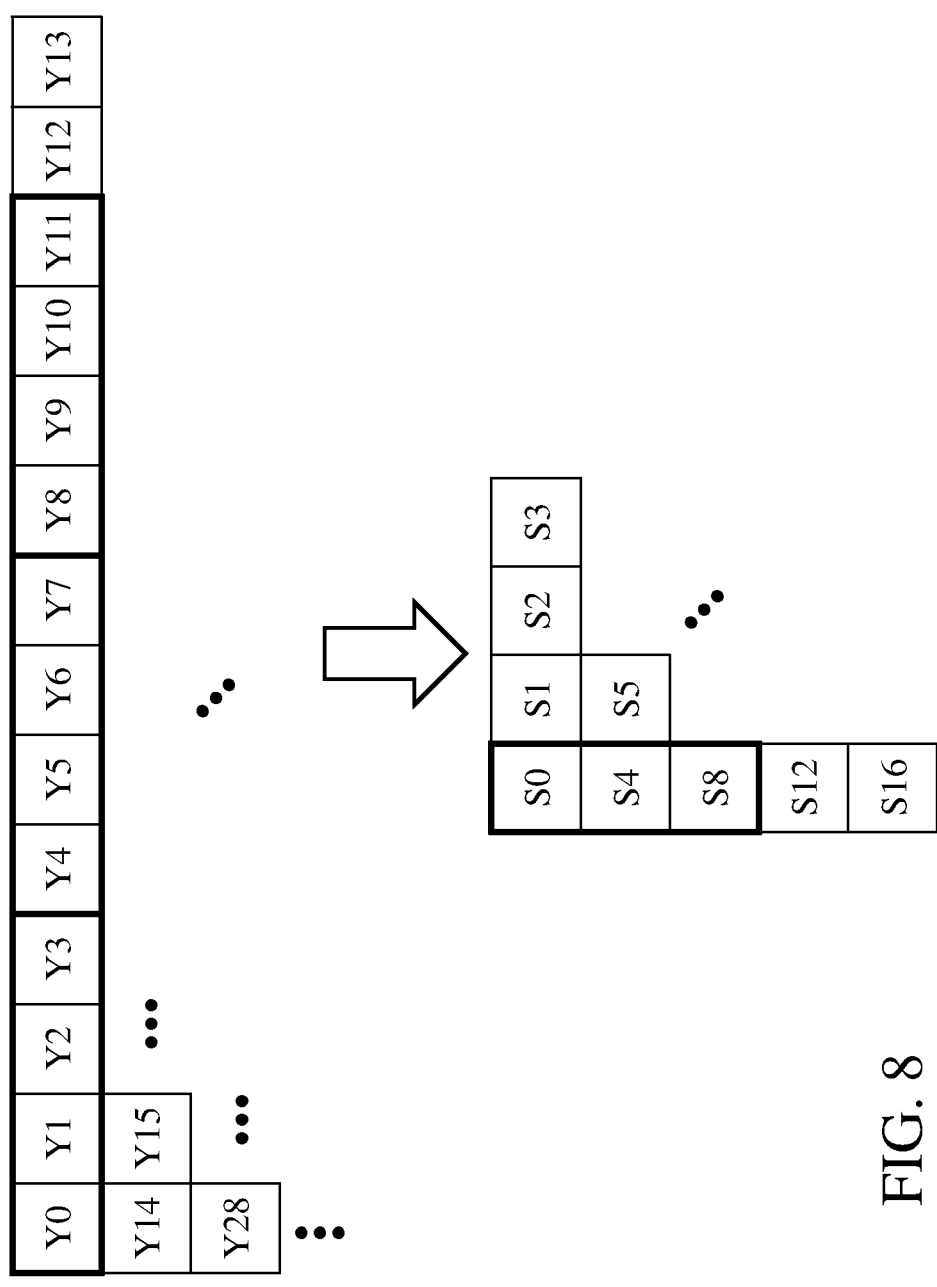
FIG. 8 is a schematic diagram illustrating the averaging operation of the pixel data.

FIGS. 7A and 7B show the sub-steps of step S247 according to an embodiment, and FIG. 8 shows a schematic diagram of the operation of averaging the pixel data. FIGS. 7A and 7B include the following steps which are performed by the down-scale circuit 330.

Step S710: selecting from the memory 124 one row of pixels in a block. As shown in the example of FIG. 8, a row of pixels includes 14 pixels, and Y0 to Y13 are the luminance values of the pixels.

Step S715: calculating the average of the luminance values of N consecutive pixels to generate a first average (N is an integer greater than 1, in the example of FIG. 8, N=4). As shown in FIG. 8, when performing this step for the first time, the down-scale circuit 330 calculates the first average $S0=(Y0+Y1+Y2+Y3)/4$, and there are $14-4=10$ pixels (Y4 to Y13 being their corresponding luminance values) remained in the row.

Step S720: determining whether the number of pixels R remained in the row is 0 (i.e., R=0), greater than or equal to N (i.e., R>=N), or between 0 and N (i.e., 0<R<N).

Step S725: When R>=N, the down-scale circuit 330 selects the next N pixels in the same row and then executes step S715. In the example of FIG. 8, after calculating the first average S0, the down-scale circuit 330 performs steps S720, S725 and S715 twice to respectively calculate the first average $S1=(Y4+Y5+Y6+Y7)/4$ and the first average $S2=(Y8+Y9+Y10+Y11)/4$.

Step S730: duplicating the luminance value of the last pixel to make up N luminance values. Continuing the above example, because there are two luminance values remained in the row (0<R=2<4) after the first average S2 is calculated, the down-scale circuit 330 duplicates the last pixel's luminance value (i.e., Y13) twice and then calculates the first average S3=(Y12+Y13+Y13+Y13)/4.

Step S735: determining whether there is any unprocessed row. More specifically, after a row is finished (the number of pixels R remained in the row is zero), if the result of step S735 is YES, the down-scale circuit 330 performs step S710 to select the next row of pixels; otherwise, the down-scale circuit 330 performs steps S740 to S765 of FIG. 7B.

Steps S740, S745, S750, S755, S760, and S765 correspond to steps S710, S715, S720, S725, S730, and S735, respectively. More specifically, the averages of the luminance values are calculated row by row in FIG. 7A to generate a plurality of first averages (S0, S1, . . . ), and then the averages of the first averages are calculated column by column in FIG. 7B to generate a plurality of second averages (Q0, Q1, . . . ). If the value of M in step S745 is three, the second average Q0=(S0+S4+S8)/3, and the second average Q1=(S12+S16+S16)/3. The second averages are the characteristic data of step S240. People having ordinary skill in the art can understand the details of the steps in FIG. 7B based on the discussions of FIG. 7A, so the discussion of FIG. 7B is omitted for brevity.

In the embodiments of FIGS. 5 to 8, after a block is processed by the down-scale circuit 330, the number of luminance values of a block becomes approximately 1/(N*M) of the number of the original luminance values. In other words, the SAD calculation circuit 310 of FIG. 5 processes less data compared to the embodiment of FIG. 3. In some embodiments, the down-scale ratios N and M used by the down-scale circuit 330 are determined or set by the processor 110.

Figure 9:
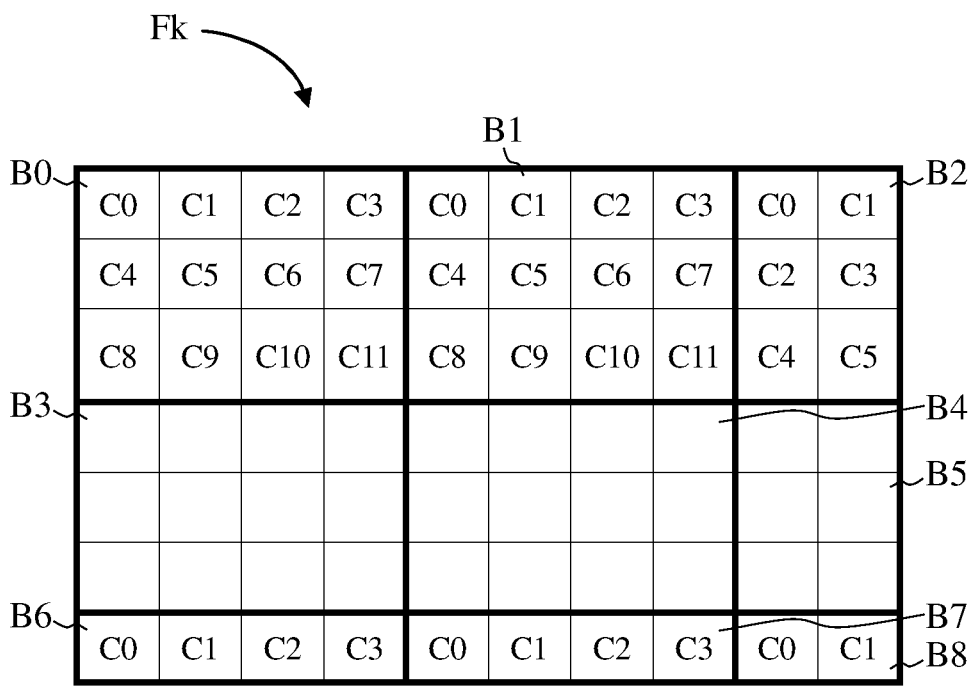
FIG. 9 shows a schematic diagram of the current frame and the previous frame.
Figure 9:
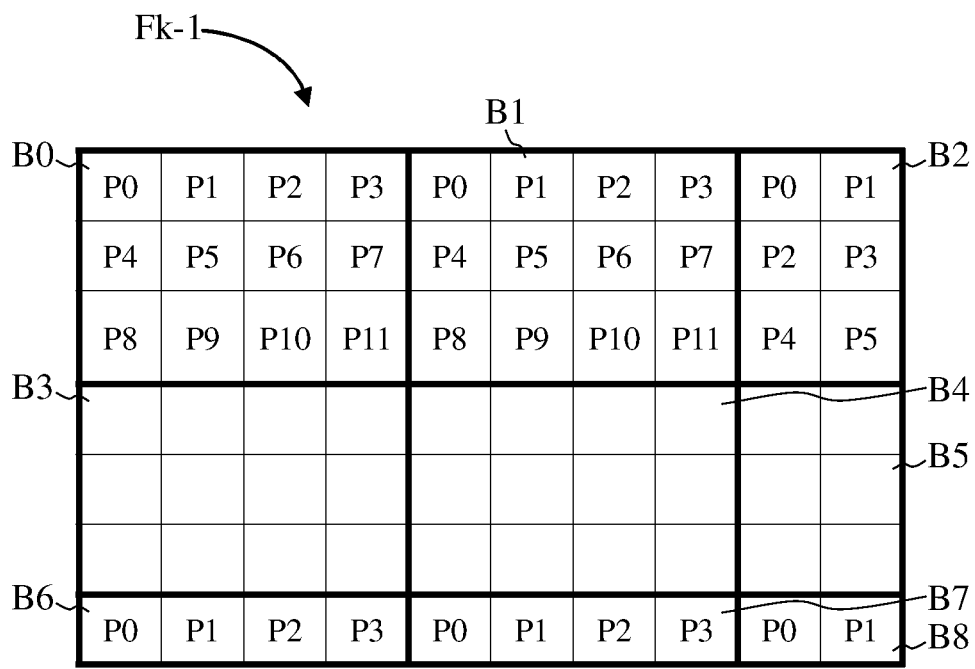

FIG. 9 shows a schematic diagram of the current frame (e.g., the $k^{th}$ frame Fk) and the previous frame (e.g., the $(k-1)^{th}$ frame Fk−1). An embodiment of step S260 is discussed below in connection with FIG. 9. In the example of FIG. 9, one frame includes 9 blocks (block B0 to block B8), of which block B0, block B1, block B3, and block B4 each contain 12 characteristic data (which are C0 to C11 for the $k^{th}$ frame Fk, and P0 to P11 for the $(k-1)^{th}$ frame Fk−1), block B2 and block B5 each contain six characteristic data, block B6 and block B7 each contain four characteristic data, and block B8 contains two characteristic data.

In some embodiments, the size of the block is determined according to the preset height H and the preset width W, which may be determined or set by the processor 110. In the example of FIG. 9, the preset width W is four and the preset height H is three; as a result, the calculation circuit 121 (more specifically, the SAD calculation circuit 310), which follows the left-to-right and top-to-bottom scanning sequence, first determines the larger blocks (i.e., block B0, block B1, block B3, and block B4) in one frame, while the smaller blocks on the right and bottom of the frame (which are block B2, block B5, block B6, block B7, and block B8 in the example of FIG. 9) contains less than W*H pieces of characteristic data.

The SAD calculation circuit 310 calculates the difference value DIFF between the corresponding blocks according to equation (1).

$$DIFF = \frac{1}{W*H}\left(\sum_{i=0}^{W*H-1} |Ci - Pi| * fc\right) \quad (1)$$

The scaling-up factor fc is shown in equation (2).

$$FC = \frac{W*H}{w*h} \quad (2)$$

where w is the width of the block (w≤W), and h is the height of the block (h≤H). In other words, the scaling-up factor fc varies with the block size. In the example of FIG. 9, for block B0, block B1, block B3 and block B4, the scaling-up factor fc=((4*3)/(4*3))=1; for block B2 and block B5, the scaling-up factor fc=((4*3)/(2*3))=2; for block B6 and block B7, the scaling-up factor fc=((4*3)/(4*1))=3; for block B8, the scaling-up factor fc=((4*3)/(2*1))=6.

In some embodiments, the processor 110 calculates the scaling-up factor fc according to the frame size, the preset width W, and the preset height H, and stores the scaling-up factor fc in the register of the calculation circuit 121 (i.e., the scaling-up factor fc is one of the parameters of the calculation circuit 121).

In some embodiments, the scaling-up factor fc is expressed in the "u(4.4)" format: the upper 4 bits of a byte represent the integer part, while the lower 4 bits of the byte represent the decimal part. The "u(4.4)" format is well known to people having ordinary skill in the art, and the details are thus omitted for brevity.

It should be noted that since the difference values and motion information of the first frame F0 of the image data cannot be calculated, the processor 110 can control the calculation circuit 121 not to calculate the plurality of difference values of the first frame F0, but the calculation circuit 121 still calculate the plurality of characteristic data of the first frame F0.

Figure 10:
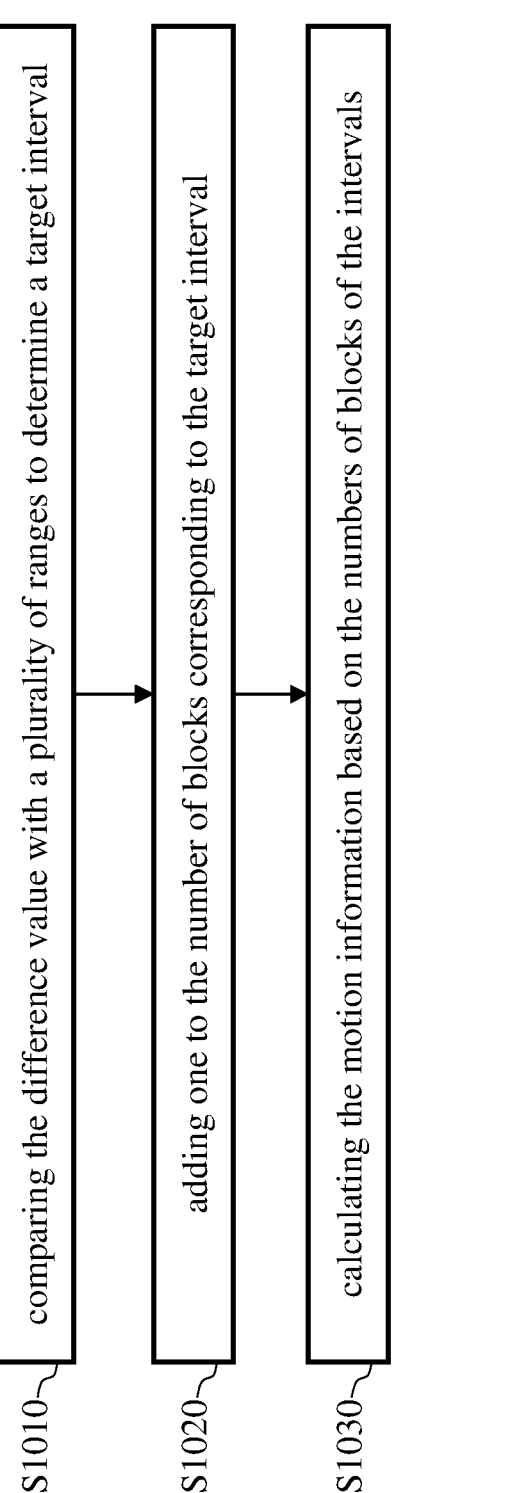
FIG. 10 is a flowchart of step S280 of FIG. 2 according to an embodiment.

Reference is made to FIG. 10 and FIG. 11. FIG. 10 is a flowchart of step S280 in FIG. 2 according to an embodiment, and FIG. 11 is a schematic diagram of statistical data according to an embodiment of the present invention. FIG. 11 shows Z intervals (interval 0 to interval Z−1), the range of each interval (range RO to range R_Z−1), and the number of blocks in each interval (the number of blocks X_0, X_1, . . . , X_Z−1). The range R_q of the interval q (0≤q≤Z−1) is between (Ymax+1)/(Z)*q and (Ymax+1)/(Z) *(q+1), and Ymax is the maximum luminance that a frame can present. For example, if Z=3 and Ymax=255, then R_0=[0, 64), R_1=[64, 128), R_2=[128, 192), and R_3= [192, 256).

An interval with a large range is a dynamic interval, while an interval with a small range is a static interval. In the example of FIG. 11, the interval 0 to the interval q−1 are the static intervals, and the interval q to the interval Z−1 are the dynamic intervals. The value of q may be predetermined by the processor 110.

FIG. 10 includes the following steps.

Step S1010: The statistical circuit 320 compares the difference value DIFF with a plurality of ranges to determine a target interval. Specifically, the statistical circuit 320 compares each difference value with the plurality of ranges (range RO to range R_Z−1) to determine the target interval (a range of which the difference value falls with) for each difference value. Continuing the above example, if the difference value DIFF=70.5, the target interval is the interval 1 (because 64 70.5<128).

Step S1020: The statistical circuit 320 adds one to the number of blocks corresponding to the target interval. If the target interval obtained in the previous step is the interval q, the statistical circuit 320 increases the number of blocks X_q by one in this step. After the statistical circuit 320 has performed statistics on all the blocks of a frame, the data shown in FIG. 11 are stored in the memory 140 through the memory control circuit 125.

Step S1030: The processor 110 reads the data of FIG. 11 from the memory 140 and calculates the motion information based on the numbers of blocks of the intervals. In some embodiments, the processor 110 calculates a ratio of the number of blocks in the dynamic interval to the total number of blocks, and uses the ratio as the motion information. For the example of FIG. 11, the motion information MI is shown in equation (3).

$$MI = \sum\nolimits_{i=q}^{Z-1} X\_i / \sum\nolimits_{i=0}^{Z-1} X\_i * 100\% \tag{3}$$

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of encoding a video which comprises a plurality of frames, each frame comprising a plurality of blocks, the method comprising:

reading a plurality of first characteristic data of a first frame from an external memory to a memory;

reading a plurality of pixel data of a second frame from the external memory to the memory, the second frame being subsequent to the first frame;

generating a plurality of second characteristic data of the second frame based on the pixel data in the memory;

encoding the pixel data of the second frame in the memory block by block;

calculating a difference value between the first characteristic data and the second characteristic data block by block;

calculating motion information according to the difference values of the blocks; and determining an encoding bitrate based on the motion information;

wherein the step of generating the second characteristic data of the second frame based on the pixel data is to extract a plurality of luminance values from the pixel data as the second characteristic data;

wherein the method further comprises: storing the second characteristic data in the external memory; and wherein the difference value is an average of a sum of absolute differences (SAD) between the first characteristic data and the second characteristic data.

2. The method of claim 1, wherein the step of generating the second characteristic data of the second frame based on the pixel data comprises:

averaging the luminance values of the pixel data to generate the second characteristic data;

wherein the number of luminance values included in the second characteristic data is less than the number of luminance values of the pixel data.

3. The method of claim 1, wherein the step of calculating the motion information according to the difference values of the blocks comprises:

comparing any of the difference values with a plurality of ranges to determine a target interval;

increasing the number of blocks corresponding to the target interval; and calculating the motion information based on the numbers of blocks of the ranges.

4. The method of claim 1, wherein the pixel data are read from the external memory to the memory only once.

5. A device for encoding a video which comprises a plurality of frames, each frame comprising a plurality of blocks, the device comprising:

a memory control circuit for reading from an external memory a plurality of first characteristic data of a first frame and a plurality of pixel data of a second frame;

a memory for storing the first characteristic data and the pixel data read from the external memory, the second frame being subsequent to the first frame;

a calculation circuit which is coupled to the memory and configured to generate a plurality of second characteristic data of the second frame based on the pixel data and calculate a difference value between the first characteristic data and the second characteristic data block by block; and a video encoding circuit which is coupled to the memory and configured to determine an encoding bitrate based on motion information and encodes the pixel data of the second frame block by block;

wherein the motion information is generated based on the difference values of the blocks;

wherein the memory control circuit stores the second characteristic data in the external memory; wherein the calculation circuit extracts a plurality of luminance values from the pixel data as the second characteristic data; and wherein the difference value is an average of a sum of absolute differences (SAD) between the first characteristic data and the second characteristic data.

6. The device of claim 5, wherein the calculation circuit comprises:

a down-scale circuit for averaging the plurality of luminance values of the pixel data to generate the second characteristic data;

wherein the number of luminance values included in the second characteristic data is less than the number of luminance values of the pixel data.

7. The device of claim 5, wherein the calculation circuit comprises a statistical circuit for comparing any of the difference values with a plurality of ranges to determine a target interval and increasing the number of blocks corresponding to the target interval; wherein the motion information is obtained based on the numbers of blocks of the ranges.

8. The device of claim 5, wherein the device reads the pixel data from the external memory to the memory only once.

9. A device for processing an image data which comprises a first frame and a second frame, comprising:

a processor;

a first memory for storing a plurality of first characteristic data of the first frame and a plurality of pixel data of the second frame, the second frame being subsequent to the first frame; and a video encoding device coupled to the processor and the first memory and comprising:

a memory control circuit for reading the first characteristic data and the pixel data from the first memory;

a second memory for storing the first characteristic data and the pixel data read from the first memory;

a calculation circuit which is coupled to the second memory and configured to generate a plurality of second characteristic data of the second frame based on the pixel data and calculate a difference value between the first characteristic data and the second characteristic data block by block; and a video encoding circuit coupled to the second memory and configured to determine an encoding bitrate based on motion information and encode the pixel data of the second frame block by block;

wherein the processor generates the motion information according to the difference values of the plurality of blocks and stores the motion information in the first memory;

wherein the video encoding device reads the pixel data from the first memory to the second memory only once;

wherein the difference value is an average of a sum of absolute differences (SAD) between the first characteristic data and the second characteristic data.

10. The device of claim 9, wherein the calculation circuit comprises:

a down-scale circuit for averaging a plurality of luminance values of the pixel data to generate the second characteristic data;

wherein the number of luminance values included in the second characteristic data is less than the number of luminance values of the pixel data.

* * * * *